(12) United States Patent
Iwakiri (10) Patent No.: US 11,193,391 B2
(45) Date of Patent: Dec. 7, 2021

(54) SUPERCHARGER

(71) Applicant: MITSUBISHI HEAVY INDUSTRIES ENGINE & TURBOCHARGER, LTD., Sagamihara (JP)

(72) Inventor: Kenichiro Iwakiri, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 84 days.

(21) Appl. No.: 16/491,487

(22) PCT Filed: Mar. 15, 2017

(86) PCT No.: PCT/JP2017/010512
§ 371 (c)(1),
(2) Date: Sep. 5, 2019

(87) PCT Pub. No.: WO2018/167892
PCT Pub. Date: Sep. 20, 2018

(65) Prior Publication Data
US 2020/0018186 A1  Jan. 16, 2020

(51) Int. Cl.
*F01D 25/24* (2006.01)
*F02C 5/00* (2006.01)
*F02C 7/36* (2006.01)

(52) U.S. Cl.
CPC .............. *F01D 25/24* (2013.01); *F02C 5/00* (2013.01); *F02C 7/36* (2013.01); *F05D 2220/40* (2013.01); *F05D 2240/60* (2013.01)

(58) Field of Classification Search
CPC .... F01D 25/24; F02C 5/00; F02C 7/36; F05D 2220/40; F05D 2240/60; Y02T 10/12;
(Continued)

(56) References Cited

U.S. PATENT DOCUMENTS 2,695,131 A    11/1954  Price
4,944,660 A    7/1990   Joco
(Continued)

FOREIGN PATENT DOCUMENTS

CA    2 301 151 C    11/2007
CN    1144937 C      4/2004
(Continued)

OTHER PUBLICATIONS

Written Opinion of the International Searching Authority for International Application No. PCT/JP2017/010512, dated May 30, 2017, with English translation.
(Continued)

*Primary Examiner* — Jacob M Amick
*Assistant Examiner* — Charles J Brauch
(74) *Attorney, Agent, or Firm* — Birch, Stewart, Kolasch & Birch, LLP (57) ABSTRACT

Provided is a supercharger (11) comprising: a hollow housing (15); a rotating shaft (14) rotatably supported by the housing (15); a turbine (12) provided at one axial end of the rotating shaft (14); and a compressor (13) provided at the other axial end of the rotating shaft (14). A threaded section (41) and a circular column section (42) are axially arranged at the other end of the rotating shaft (14). A threaded hole (43) with which the threaded section (41) is engaged and a fitting hole (44) in which the circular column section (42) is fitted are axially arranged in the compressor (13). The axial length of the circular column section (42) and the fitting hole (44) is set to be greater than the axial length of the threaded section (41) and the threaded hole (43).

15 Claims, 5 Drawing Sheets

(58) Field of Classification Search
CPC .... F16C 2360/24; F04D 29/266; F02B 37/00; F02B 39/00
See application file for complete search history.

(56) References Cited

U.S. PATENT DOCUMENTS

| | | | |
|---|---|---|---|
| 6,017,184 A | 1/2000 | Aguilar et al. | |
| 6,145,313 A | 11/2000 | Arnold | |
| 7,223,077 B2 | 5/2007 | Nishiyama et al. | |
| 9,074,477 B2 | 7/2015 | Pinkney et al. | |
| 2012/0107112 A1 | 5/2012 | Barlog | |
| 2012/0107122 A1* | 5/2012 | Albers | F01D 25/246 416/179 |
| 2016/0010492 A1 | 1/2016 | Cavagnaro | |

FOREIGN PATENT DOCUMENTS

| | | | | |
|---|---|---|---|---|
| CN | 1654827 A * | 8/2005 | ........... | F04D 29/266 |
| CN | 202468015 U | 10/2012 | | |
| CN | 103089407 A | 6/2013 | | |
| CN | 293296326 U | 11/2013 | | |
| CN | 104105857 A | 10/2014 | | |
| JP | 5-504804 A | 7/1993 | | |
| JP | 2001-512801 A | 8/2001 | | |
| JP | 2005-2849 A | 1/2005 | | |
| JP | 2009-209867 A | 9/2009 | | |
| JP | 5067208 B2 | 11/2012 | | |
| WO | WO 2006/005355 A1 | 1/2006 | | |
| WO | WO 2015/138183 A1 | 9/2015 | | |
| WO | WO-2015138183 A1 * | 9/2015 | ........... | F04D 29/266 |

OTHER PUBLICATIONS

Chinese Office Action and Search Report for Chinese Application No. 201780088022.X, dated Nov. 3, 2020, with English translation of the Office Action.
Extended European Search Report dated Dec. 2, 2019, for corresponding European Patent Application No. 17900722.4.

* cited by examiner

SUPERCHARGER

TECHNICAL FIELD

The present invention relates to a turbocharger in which a turbine and a compressor are connected to each other by a rotary shaft.

BACKGROUND ART

An exhaust turbine turbocharger is configured as follows. A compressor and a turbine are integrally connected to each other by a rotary shaft, and the compressor and the turbine are rotatably accommodated inside a housing. Then, exhaust gas is supplied into the housing, and the turbine is rotated. In this manner, the rotary shaft is rotationally driven, and the compressor is rotationally driven. The compressor suctions air from the outside, pressurizes the air by an impeller so as to generate compressed air, and supplies the compressed air to an internal combustion engine.

According to the exhaust turbine turbocharger configured in this way, the rotary shaft is integrally formed in turbine blades, and a through-hole of a compressor wheel is formed therein. The rotary shaft of the turbine blades is inserted into the through-hole of the compressor wheel, and a nut is screwed to an end portion of the rotary shaft. In this manner, the compressor wheel and the turbine blades are integrally fastened to each other. However, according to this configuration of the turbocharger, it is necessary to provide the nut for fastening the rotary shaft of the turbine blades inserted into the through-hole of the compressor wheel. Therefore, the number of components inevitably increases.

As a solution to this problem, for example, a turbocharger is disclosed in PTL 1 below. According to the turbocharger disclosed in PTL 1, the rotary shaft is integrally formed in turbine blades, a blind screw hole is formed in the compressor wheel, and a screw portion formed in the rotary shaft of the turbine impeller is screwed into the blind screw hole. In this manner, the compressor impeller and the turbine blades are fastened to each other. Therefore, the screw portion of the rotary shaft of the turbine blades is directly screwed into the blind screw hole formed in the compressor impeller. Accordingly, it is not necessary to provide the nut.

CITATION LIST

Patent Literature

[PTL 1] Japanese Unexamined Patent Application Publication No. 2009-209867

SUMMARY OF INVENTION

Technical Problem

According to the turbocharger disclosed in PTL 1, the screw portion formed in the rotary shaft of the turbine blades is screwed into the blind screw hole of the compressor wheel so that both of these are fastened to each other. In this case, while in a state where the turbine blades (screw portion of the rotary shaft) are pressed using a jig so as not to be rotatable, the compressor impeller is rotated via jig mounted on a tip portion of the compressor impeller. In this manner, the screw portion of the rotary shaft and the blind screw hole of a compressor blade are screwed to each other. However, according to this configuration, respective axial centers of the rotary shaft and the compressor blade are less likely to very accurately coincide with each other, and it takes a long time to screw the screw portion and the blind screw hole to each other, thereby resulting in poor workability. In addition, when the screw portion and the blind screw hole are not properly screwed to each other, there is a possibility that the screw portion or the blind screw hole may be damaged.

The present invention is made in order to solve the above-described problem, and an object thereof is to provide a turbocharger in which a rotary shaft and a compressor which are disposed in a turbine can be very accurately fastened to each other so as to improve assembly workability.

Solution to Problem

In order to achieve the above-described object, a turbocharger according to the present invention includes a housing having a hollow shape, a rotary shaft rotatably supported by the housing, a turbine disposed in one end portion in an axial direction in the rotary shaft, and a compressor disposed in the other end portion in the axial direction in the rotary shaft. A screw portion and a column portion are disposed along the axial direction in the other end portion of the rotary shaft. A screw hole into which the screw portion is screwed and a fitting hole into which the column portion is fitted are disposed along the axial direction in the compressor. Each axial length dimension of the column portion and the fitting hole is set to be longer than each axial length dimension of the screw portion and the screw hole.

Therefore, in order to connect the rotary shaft disposed in the turbine to the compressor, if the screw portion and the column portion which are disposed in the other end portion of the rotary shaft are inserted into the screw hole and the fitting hole which are disposed in the compressor, the column portion and the fitting hole are longer than the screw portion and the screw hole. Accordingly, the column portion is fitted into the fitting hole before the screw portion is screwed into the screw hole. In this manner, a shaft center of the rotary shaft coincides with a shaft center of the compressor. Therefore, the screw portion of the rotary shaft can be very accurately screwed into the screw hole of the compressor. Accordingly, it is possible to suppress damage to the screw portion of the rotary shaft or the screw hole of the compressor. In addition, the shaft center of the rotary shaft and the shaft center of the compressor coincide with each other at an early stage, and the screw portion of the rotary shaft is very accurately screwed into the screw hole of the compressor. Therefore, it is possible to improve workability in assembling the turbine and the compressor with each other.

In the turbocharger according to the present invention, the column portion may be disposed on a side of the other end portion of the rotary shaft from the screw portion, and the screw hole may be disposed on a side of an attachment surface of the compressor from the fitting hole.

Therefore, when the rotary shaft is connected to the compressor, the column portion of the rotary shaft is fitted into the fitting hole of the compressor so that the shaft center of the rotary shaft coincides with the shaft center of the compressor. Thereafter, the screw portion of the rotary shaft is very accurately screwed into the screw hole of the compressor. Therefore, it is possible to suppress damage caused by interference between the screw portion and the compressor.

In the turbocharger according to the present invention, an outer diameter dimension of the column portion may be set to be smaller than an inner diameter dimension of the screw hole.

Therefore, when the rotary shaft is connected to the compressor, the column portion of the rotary shaft is properly fitted into the fitting hole of the compressor through the screw hole. Therefore, it is possible to suppress damage caused by interference between the column portion and the screw hole.

In the turbocharger according to the present invention, the screw portion may be disposed on a side of the other end portion of the rotary shaft from the column portion, and the fitting hole may be disposed on a side of an attachment surface of the compressor from the screw hole.

Therefore, when the rotary shaft is connected to the compressor, and when the screw portion of the rotary shaft passes through the fitting hole of the compressor, the column portion is fitted into the fitting hole of the compressor so that both the shaft centers coincide with each other. Thereafter, the screw portion of the rotary shaft is very accurately screwed into the screw hole of the compressor. Therefore, it is possible to suppress the damage caused by the interference between the screw portion and the compressor.

In the turbocharger according to the present invention, an inner diameter dimension of the fitting hole may be set to be larger than an outer diameter dimension of the screw portion.

Therefore, when the rotary shaft is connected to the compressor, the screw portion of the rotary shaft is properly screwed into the screw hole through the fitting hole of the compressor. Therefore, it is possible to suppress damage caused by interference between the screw portion and the fitting hole.

In the turbocharger according to the present invention, the screw hole and the fitting hole may be disposed on a side of an attachment surface of the compressor from a largest outer diameter position of the compressor.

Therefore, a position where the screw portion of the rotary shaft is screwed into the screw hole of the compressor and a position where the column portion is fitted into the fitting hole are not located at the largest outer diameter position of the compressor. Accordingly, centrifugal stress acting on the largest outer diameter position during the rotation of the compressor does not directly affect the screw hole and the fitting hole. Therefore, it is possible to suppress strength weakening of the compressor.

In the turbocharger according to the present invention, the screw hole and the fitting hole may be disposed on a side of a tip portion of the compressor from a largest outer diameter position of the compressor.

Therefore, the position where the screw portion of the rotary shaft is screwed into the screw hole of the compressor and the position where the column portion is fitted into the fitting hole are not located at the largest outer diameter position of the compressor. Accordingly, the centrifugal stress acting on the largest outer diameter position during the rotation of the compressor does not directly affect the screw hole and the fitting hole. Therefore, it is possible to suppress the strength weakening of the compressor.

In the turbocharger according to the present invention, the screw hole and the fitting hole may be open toward a side of an attachment surface of the compressor, and may be closed toward a side of a tip portion of the compressor.

Therefore, the tip portion side of the compressor in the screw hole and the fitting hole is closed. Therefore, it is possible to suppress the strength weakening of the compressor.

In the turbocharger according to the present invention, the screw hole and the fitting hole may be open toward a side of an attachment surface and a side of a tip portion of the compressor.

Therefore, each length of the screw hole and the fitting hole can be lengthened, and fastening strength can be improved.

In the turbocharger according to the present invention, the other end portion of the rotary shaft protrudes to the side of the tip portion of the compressor, and has a tapered shape.

Therefore, the other end portion of the rotary shaft protrudes to the side of the tip portion of the compressor so as to form the tapered shape. Accordingly, air suctioned from a suction opening of the compressor is less likely to be separated in the other end portion of the rotary shaft. Therefore, it is possible to suppress a decrease in aerodynamic performance.

Advantageous Effects of Invention

According to the turbocharger of the present invention, the rotary shaft and the compressor which are disposed in the turbine can be very accurately fastened to each other. Therefore, it is possible to improve assembly workability.

DESCRIPTION OF EMBODIMENTS

Hereinafter, preferred embodiments of a turbocharger according to the present invention will be described in detail with reference to the accompanying drawings. The present invention is not limited by the embodiments. In addition, in a case where there are a plurality of embodiments, the present invention also includes configurations in which the respective embodiments are combined with each other.

First Embodiment

Figure 1:
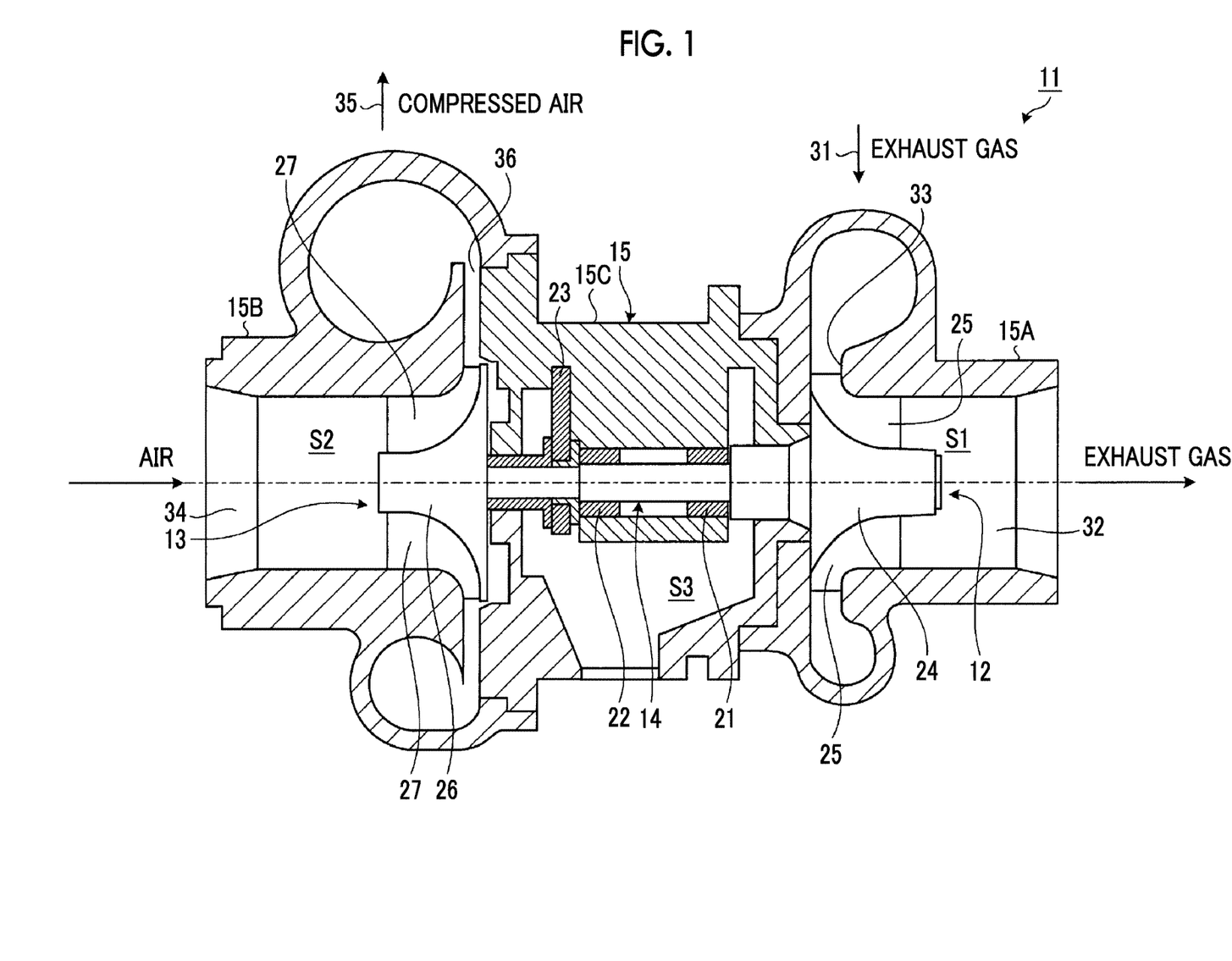
FIG. 1 is an overall configuration diagram illustrating an exhaust turbine turbocharger according to a first embodiment.
Figure 2:
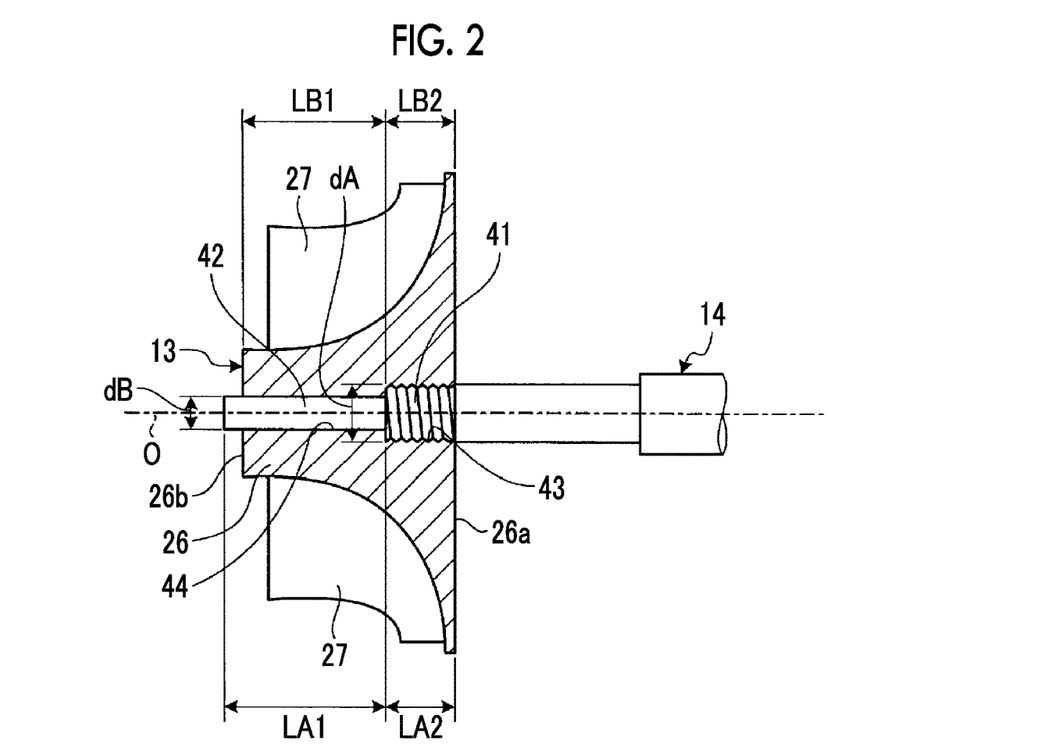
FIG. 2 is a sectional view illustrating a screw fastening portion between a compressor and a rotary shaft in the exhaust turbine turbocharger according to the first embodiment.

FIG. 1 is an overall configuration diagram illustrating an exhaust turbine turbocharger according to a first embodiment, and FIG. 2 is a sectional view illustrating a screw fastening portion between a compressor and a rotary shaft in the exhaust turbine turbocharger according to the first embodiment.

As illustrated in FIG. 1, an exhaust turbine turbocharger 11 is configured to mainly include a turbine 12, a compressor 13, and a rotary shaft 14, all of which are accommodated inside a housing 15.

The housing 15 has a turbine housing 15A internally formed in a hollow shape and forming a first space portion S1 for accommodating configurations of the turbine 12, a compressor housing 15B forming a second space portion S2 for accommodating configurations of the compressor 13, and a bearing housing 15C forming a third space portion S3 for accommodating the rotary shaft 14. The third space portion S3 of the bearing housing 15C is located between the first space portion S1 of the turbine housing 15A and the second space portion S2 of the compressor housing 15B.

In the rotary shaft 14, an end portion on the turbine 12 side is rotatably supported by a journal bearing 21 serving as a turbine side bearing, and an end portion on the compressor 13 side is rotatably supported by a journal bearing 22 serving as a compressor side bearing. The rotary shaft 14 is restricted by a thrust bearing 23 in moving in an axial direction in which the rotary shaft 14 extends. In the rotary shaft 14, a turbine disk 24 of the turbine 12 is fixed to one end portion in the axial direction of the rotary shaft 14. The turbine disk 24 is accommodated in the first space portion S1 of the turbine housing 15A, and a plurality of turbine blades 25 having an axial flow type are disposed in an outer peripheral portion at a predetermined interval in a circumferential direction. In addition, in the rotary shaft 14, a compressor impeller 26 of the compressor 13 is fixed to the other end portion in the axial direction of the rotary shaft 14. The compressor impeller 26 is accommodated in the second space portion S2 of the compressor housing 15B, and a plurality of blades are disposed in the outer peripheral portion at a predetermined interval in the circumferential direction.

The turbine housing 15A has an inlet passage 31 of exhaust gas and an outlet passage 32 of the exhaust gas for the turbine blade 25. Then, the turbine housing 15A has a turbine nozzle 33 disposed between the inlet passage 31 and the turbine blade 25. A flow of the exhaust gas flowing in the axial direction, which is subjected to static pressure expansion by the turbine nozzle 33 is guided to the plurality of turbine blades 25. In this manner, the turbine 12 can be rotationally driven. The compressor housing 15B has a suction opening 34 and a compressed air discharge port 35 for the compressor impeller 26. Then, the compressor housing 15B has a diffuser 36 disposed between the compressor impeller 26 and the compressed air discharge port 35. Air compressed by the compressor impeller 26 is discharged through the diffuser 36.

Therefore, in the exhaust turbine turbocharger 11, the turbine 12 is driven using the exhaust gas discharged from an engine (not illustrated), and the rotation of the turbine 12 is transmitted to the rotary shaft 14 so as to drive the compressor 13. The compressor 13 compresses gas for combustion, and supplies the compressed gas to the engine. Therefore, the exhaust gas supplied from the engine passes through the inlet passage 31 of the exhaust gas, and is subjected to the static pressure expansion by the turbine nozzle 33. The flow of the exhaust gas flowing in the axial direction is guided to the plurality of turbine blades 25. In this manner, the turbine 12 is rotationally driven via the turbine disk 24 to which the plurality of turbine blades 25 are fixed. Then, the exhaust gas driving the plurality of turbine blades 25 is discharged outward of the outlet passage 32. On the other hand, if the rotary shaft 14 is rotated by the turbine 12, the integrated compressor impeller 26 is rotated, and the air is suctioned through the suction opening 34. The suctioned air is pressurized by the compressor impeller 26 so as to be the compressed air. The compressed air passes through the diffuser 36, and is supplied to the engine from the compressed air discharge port 35.

In the exhaust turbine turbocharger 11 according to the first embodiment, the turbine 12 is configured as follows. The plurality of turbine blades 25 are integrally disposed in the outer peripheral portion of the turbine disk 24, and one end portion of the rotary shaft 14 is integrally disposed at a shaft center position on an attachment surface side of the turbine disk 24. On the other hand, the compressor 13 is configured as follows. The plurality of blades 27 are integrally disposed in the outer peripheral portion of the compressor impeller 26, and the other end portion of the rotary shaft 14 is connected to the shaft center position on the attachment surface side of the compressor impeller 26. In this case, the compressor 13 and the rotary shaft 14 are assembled to each other at a concentric position (shaft center O).

That is, as illustrated in FIG. 2, a screw portion and a column portion 42 are disposed along the axial direction in the other end portion (left end portion in FIG. 2) of the rotary shaft 14. In the compressor 13, a screw hole 43 into which the screw portion 41 is screwed and a cylindrical fitting hole 44 into which the column portion 42 is fitted are disposed along the axial direction. In the rotary shaft 14, the column portion 42 is disposed on the other end portion side of the rotary shaft 14 from the screw portion 41. In the compressor 13, the screw hole 43 is disposed on the attachment surface 26a side of the compressor impeller 26 from the fitting hole 44. Here, in the compressor 13, the screw hole 43 and the fitting hole 44 are open toward the attachment surface 26a side and the tip portion 26b side of the compressor impeller 26. That is, the screw hole 43 and the fitting hole 44 serve as through-holes disposed along the shaft center O of the compressor impeller 26.

Then, in the rotary shaft 14, an axial length dimension LA1 of the column portion 42 is set to be longer than an axial length dimension LA2 of the screw portion 41. In addition, in the compressor 13, an axial length dimension LB1 of the fitting hole 44 is set to be longer than an axial length dimension LB2 of the screw hole 43. Here, the axial length dimension LA2 of the screw portion 41 of the rotary shaft 14 and the axial length dimension LB2 of the screw hole 43 of the compressor 13 are set to be substantially the same as each other. In addition, an axial length dimension LA1 of the column portion 42 of the rotary shaft 14 is set to be longer than an axial length dimension LB1 of the fitting hole 44 of the compressor 13. That is, in a state where the compressor 13 is assembled to the rotary shaft 14, the column portion 42 of the rotary shaft 14 protrudes as much as a predetermined length outward of the tip portion 26b of the compressor impeller 26 from the fitting hole 44 of the compressor 13. In this case, the axial length dimension LA1 of the column portion 42 of the rotary shaft 14 may be set to be the same as or shorter than the axial length dimension LB1 of the fitting hole 44 of the compressor 13. In this manner, a configuration may be adopted so that the column portion 42 of the rotary shaft 14 does not protrude outward of the tip portion 26b of the compressor impeller 26 from the fitting hole 44 of the compressor 13.

In addition, an outer diameter dimension of the column portion 42 of the rotary shaft 14 and an inner diameter dimension of the fitting hole 44 of the compressor 13 are substantially the same as each other. The outer diameter dimension of the column portion 42 of the rotary shaft 14 is set to be slightly smaller than the inner diameter dimension of the fitting hole 44 of the compressor 13 so that both of these can be fitted to each other. In addition, a pitch diameter of the screw portion of the rotary shaft 14 and a pitch diameter of the screw hole 43 of the compressor 13 are substantially the same as each other. The pitch diameter of the screw portion 41 of the rotary shaft 14 is set to be slightly smaller than the pitch diameter of the screw hole 43 of the compressor 13 so that both of these can be screwed to each other. Here, an outer diameter dimension dB of the column portion 42 of the rotary shaft 14 is set to be smaller diameter than an inner diameter dimension dA of the screw hole 43 of the compressor 13.

Therefore, when the rotary shaft 14 disposed in the turbine 12 is connected to the compressor 13, the screw portion 41 and the column portion 42 which are disposed in the other end portion of the rotary shaft 14 are rotated by being inserted into the screw hole 43 and the fitting hole 44 which are disposed in the compressor 13. In this case, in the rotary shaft 14, the column portion 42 is first fitted into the fitting hole 44 through the screw hole 43 of the compressor 13. That is, the outer diameter dimension dB of the column portion 42 of the rotary shaft 14 is smaller than the inner diameter dimension dA of the screw hole 43. Accordingly, the outer peripheral surface of the column portion 42 does not come into contact with the inner peripheral surface of the screw hole 43. In addition, the axial length dimension LA1 of the column portion 42 of the rotary shaft 14 is longer than the axial length dimension LB2 of the screw hole 43 of the compressor 13. Accordingly, the column portion 42 is fitted into the fitting hole 44 before the screw portion 41 comes into contact with the screw hole 43. Therefore, since the column portion 42 is fitted into the fitting hole 44, the shaft center of the rotary shaft 14 and the shaft center O of the compressor 13 coincide with each other. Thereafter, when the screw portion 41 of the rotary shaft 14 is screwed into the screw hole 43 of the compressor 13, the respective shaft centers of the rotary shaft 14 and the compressor 13 coincide with each other. Therefore, the screw portion 41 and the screw hole 43 are properly screwed to each other without being damaged.

Figure 3:
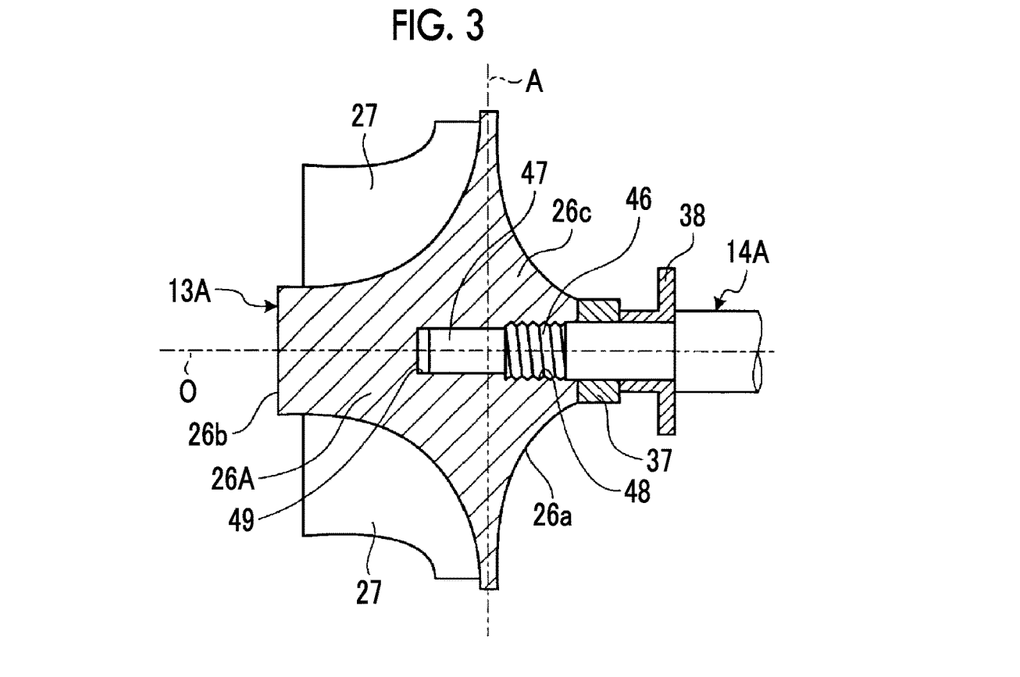
FIG. 3 is a sectional view illustrating a screw fastening portion between a compressor and a rotary shaft, which illustrates a modification example of the exhaust turbine turbocharger according to the first embodiment.

The screw portion 41 and the column portion 42 of the rotary shaft 14 and the screw hole 43 and the fitting hole 44 of the compressor 13 are not limited to the above-described configuration. FIG. 3 is a sectional view illustrating a screw fastening portion between a compressor and a rotary shaft, which illustrates a modification example of the exhaust turbine turbocharger according to the first embodiment.

As illustrated in FIG. 3, the other end portion (left end portion in FIG. 3) of a rotary shaft 14A has a screw portion 46 and a column portion 47 which are disposed along the axial direction. In a compressor 13A, a screw hole 48 into which the screw portion 46 is screwed and a cylindrical fitting hole 49 into which the column portion 47 is fitted are disposed along the axial direction. In the rotary shaft 14A, the column portion 47 is disposed on a side of the other end portion of the rotary shaft 14A from the screw portion 46. In the compressor 13A, the screw hole 48 is disposed on a side of an attachment surface 26a of a compressor impeller 26A from the fitting hole 49.

The compressor 13A has an expanded portion 26c in which the attachment surface 26a has a truncated cone shape toward the shaft center O. The screw hole 48 and the fitting hole 49 are open toward the attachment surface 26a side of the compressor impeller 26A, and are closed toward the tip portion 26b side. That is, the screw hole and the fitting hole 49 serve as an insertion hole whose tip portion is closed along the shaft center O of the compressor impeller 26A. Then, in the compressor 13A, the screw hole 48 is located on a side of the attachment surface 26a from a largest outer diameter position A in the axial direction. A relationship between the axial length dimension and the inner diameter dimension of the screw portion 46, the column portion 47, the screw hole 48, and the fitting hole 49 is the same as that described above. In addition, in the rotary shaft 14A, one end portion side from the screw portion 46 is supported by a thrust sleeve 37 and a thrust ring 38, and the thrust ring 38 is supported by the thrust bearing 23.

In this way, the turbocharger according to the first embodiment includes the housing 15 having a hollow shape, the rotary shaft 14 rotatably supported by the housing 15, the turbine 12 disposed in one end portion in the axial direction in the rotary shaft 14, and the compressor 13 disposed in the other end portion in the axial direction in the rotary shaft 14. The screw portions 41 and 46 and the column portions 42 and 47 are disposed along the axial direction in the other end portion of the rotary shaft 14. The screw holes 43 and 48 into which the screw portions 41 and 46 are screwed and the fitting holes 44 and 49 into which the column portions 42 and 47 are fitted are disposed along the axial direction in the compressor 13. The axial length dimension of the column portions 42 and and the fitting holes 44 and 49 is set to be longer than the axial length dimension of the screw portions 41 and 46 and the screw holes 43 and 48.

Therefore, the rotary shafts 14 and 14A integrated with the turbine 12 is connected to the compressors 13 and 13A. Accordingly, the screw portions 41 and 46 and the column portions 42 and 47 which are disposed in the other end portion of the rotary shafts 14 and 14A are inserted into the screw holes 43 and 48 and the fitting holes 44 and 49 which are disposed in the compressors 13 and 13A, the column portions 42 and 47 and the fitting holes 44 and 49 are longer than the screw portions 41 and 46 and the screw holes 43 and 48. Accordingly, the column portions 42 and 47 are fitted into the fitting holes 44 and 49 before the screw portions 41 and 46 are screwed into the screw holes 43 and 48. In this manner, the shaft center O of the compressors 13 and 13A coincides with the shaft center O of the rotary shafts 14 and 14A. Therefore, the screw portions 41 and 46 of the rotary shafts 14 and 14A are very accurately screwed into the screw holes 43 and 48 of the compressors 13 and 13A. Accordingly, it is possible to suppress damage to the screw portions 41 and 46 of the rotary shafts 14 and 14A or the screw holes 43 and 48 of the compressors 13 and 13A. In addition, the shaft center O of the rotary shafts 14 and 14A and the shaft center O of the compressors 13 and 13A coincide with each other at an early stage. The screw portions 41 and of the rotary shafts 14 and 14A are very accurately screwed into the screw holes 43 and 48 of the compressors 13 and 13A. Therefore, it is possible to improve workability in assembling the turbine 12 and the compressors 13 and 13A.

In the turbocharger according to the first embodiment, the column portions 42 and 47 are disposed on the side of the other end portion of the rotary shafts 14 and 14A from the screw portions 41 and 46, and the screw holes 43 and 48 are disposed on the side of the attachment surface 26a of the compressors 13 and 13A from the fitting holes 44 and 49. Therefore, when the rotary shafts 14 and 14A are connected to the compressors 13 and 13A, the column portions 42 and 47 of the rotary shafts 14 and 14A are fitted into the fitting holes 44 and 49 of the compressors 13 and 13A so that the shaft center O of the rotary shafts 14 and 14A coincides with the shaft center O of the compressors 13 and 13A. Accordingly, thereafter, the screw portions 41 and 46 of the rotary shafts 14 and 14A are very accurately screwed into the screw holes 43 and 48 of the compressors 13 and 13A. Therefore, it is possible to suppress damage caused by interference between the screw portions 41 and 46 and the compressor 13 and 13A.

In the turbocharger according to the first embodiment, the outer diameter dimension of the column portion 42 and 47 is set to be smaller than the inner diameter dimension of the screw holes 43 and 48. Therefore, when the rotary shafts 14 and 14A are connected to the compressors 13 and 13A, the column portions 42 and 47 of the rotary shafts 14 and 14A pass through the screw holes 43 and 48, and are properly fitted into the fitting holes 44 and 49 of the compressors 13 and 13A. Therefore, it is possible to suppress damage caused by interference between the column portions 42 and 47 and the screw holes 43 and 48.

In the turbocharger according to the first embodiment, the screw hole 48 and the fitting hole 49 are open toward the attachment surface 26a side of the compressor 13A, and are closed toward the tip portion 26b side of the compressor 13A. Accordingly, the tip portion 26b side of the compressor 13A in the screw hole 43 and the fitting hole 44 is closed. Therefore, it is possible to suppress strength weakening of the compressor 13A.

In the turbocharger according to the first embodiment, the screw hole 43 and the fitting hole 44 are open toward the attachment surface 26a side and the tip portion 26b side of the compressor 13. Therefore, each length of the screw hole 43 and the fitting hole 44 can be lengthened, and fastening strength can be improved.

In the turbocharger according to the first embodiment, in the compressor 13, the screw hole 43 is disposed at the largest outer diameter position A in the axial direction. In the compressor 13A, the screw hole 48 is disposed in the vicinity of the largest outer diameter position A in the axial direction. Therefore, the outer diameter of the screw hole 43 can be increased, and fastening strength with the rotary shafts 14 and 14A can be improved.

Second Embodiment

Figure 4:
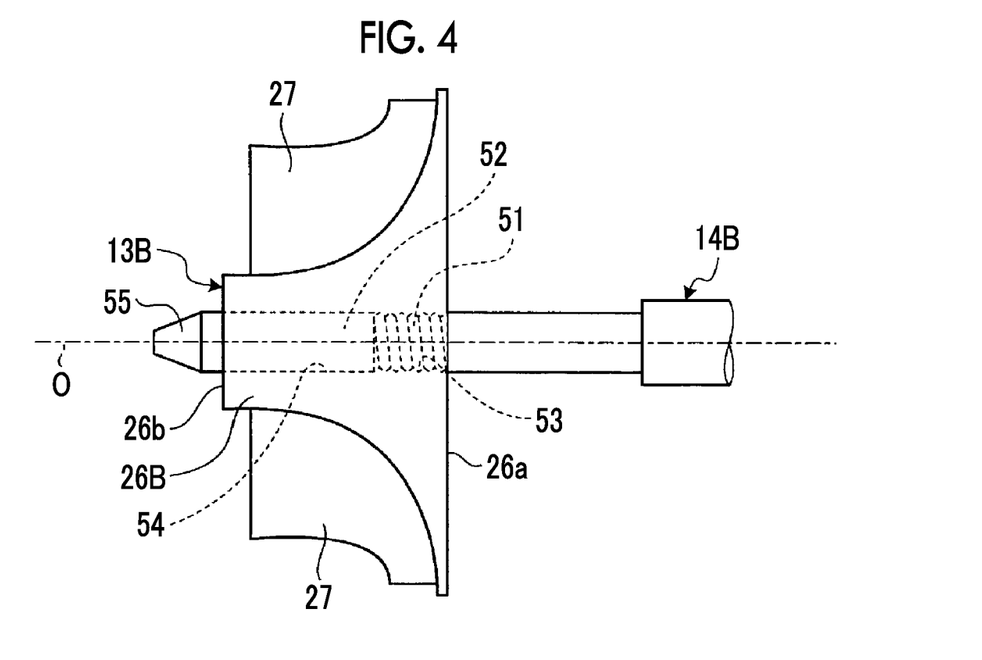
FIG. 4 is a sectional view illustrating a screw fastening portion between a compressor and a rotary shaft in an exhaust turbine turbocharger according to a second embodiment.

FIG. 4 is a sectional view illustrating a screw fastening portion between a compressor and a rotary shaft in an exhaust turbine turbocharger according to a second embodiment. The same reference numerals will be given to members having the same functions as those according to the above-described embodiment, and detailed description thereof will be omitted.

In the second embodiment, as illustrated in FIG. 4, a screw portion 51 and a column portion 52 are disposed along the axial direction in the other end portion of a rotary shaft 14B. In a compressor 13B, a screw hole 53 into which the screw portion 51 is screwed and a cylindrical fitting hole 54 into which the column portion 52 is fitted are disposed along the axial direction. In the rotary shaft 14B, the column portion 52 is disposed on a side of the other end portion of the rotary shaft 14B from the screw portion 51. In the compressor 13B, the screw hole 53 is disposed on a side of the attachment surface 26a of the compressor impeller 26B from the fitting hole 54.

Here, in the compressor 13B, the screw hole 53 and the fitting hole 54 are open toward the attachment surface 26a side and the tip portion 26b side of the compressor impeller 26B. That is, the screw hole 53 and the fitting hole 54 serve as a through-hole disposed along the shaft center O of the compressor impeller 26B. Then, in the rotary shaft 14B, the other end portion protrudes to the tip portion 26b side of the compressor 13B, and has a tapered shape. That is, the rotary shaft 14B is formed into the tapered shape by forming a truncated cone portion 55 at a position of the other end portion exposed from the compressor 13B. A relationship between the axial length dimension and the inner diameter dimension of the screw portion 51, the column portion 52, the screw hole 53, and the fitting hole 54 is the same as that described in the first embodiment.

Figure 5:
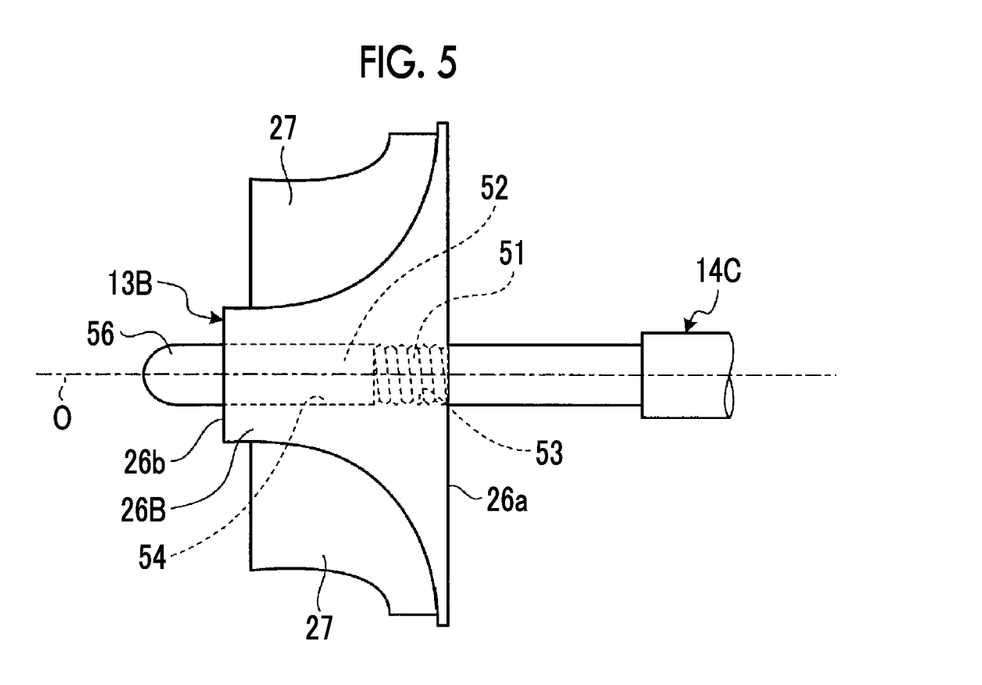
FIG. 5 is a sectional view illustrating a screw fastening portion between a compressor and a rotary shaft, which illustrates a modification example of the exhaust turbine turbocharger according to the second embodiment.

The tapered shape of the other end portion of the rotary shaft 14B is not limited to the above-described shape. FIG. 5 is a sectional view illustrating a screw fastening portion between a compressor and a rotary shaft, which illustrates a modification example of the exhaust turbine turbocharger according to the second embodiment.

As illustrated in FIG. 5, in a rotary shaft 14C, the other end portion protrudes toward the tip portion 26b of the compressor 13B, and has a tapered shape. That is, the rotary shaft 14C is formed into the tapered shape by forming a hemispherical surface portion 56 at a position of the other end portion exposed from the compressor 13B. A relationship between the axial length dimension and the inner diameter dimension of the screw portion 51, the column portion 52, the screw hole 53, and the fitting hole 54 is the same as that described in the first embodiment.

In this way, in the turbocharger according to the second embodiment, the truncated cone portion 55 or the hemispherical surface portion 56 is disposed in the other end portion of the rotary shafts 14B and 14C, thereby forming the tapered shape. Therefore, the air suctioned from the suction opening 34 of the compressor 13B smoothly flows without being separated by the truncated cone portion 55 or the hemispherical surface portion 56 of the rotary shafts 14B and 14C. Accordingly, it is possible to suppress a decrease in aerodynamic performance. In addition, it is possible to suppress an increase in component costs without requiring a separate component mounted thereon in order to form the tapered shape in the other end portion of the rotary shafts 14B and 14C.

Third Embodiment

Figure 6:
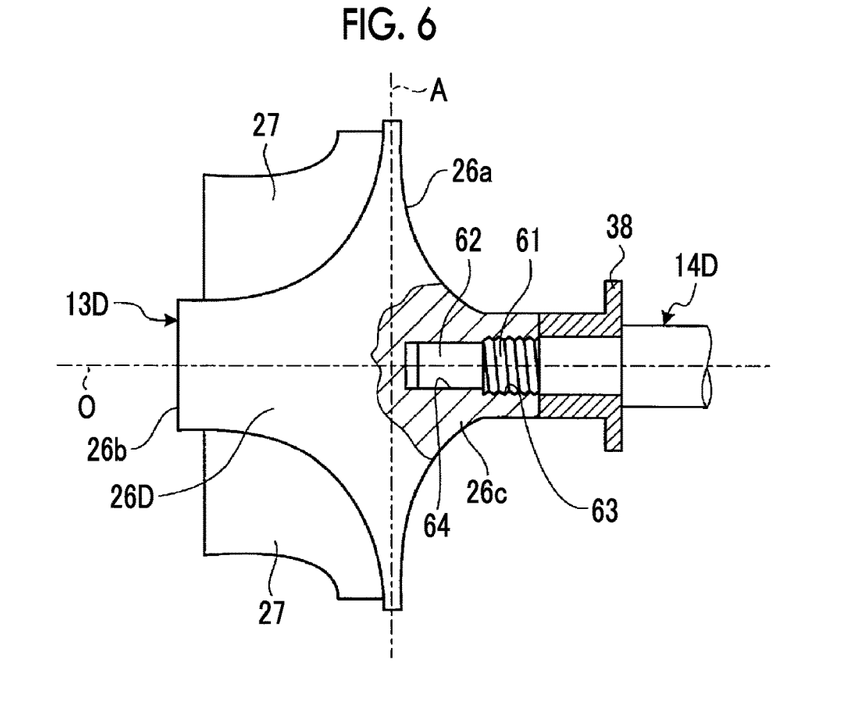
FIG. 6 is a sectional view illustrating a screw fastening portion between a compressor and a rotary shaft in an exhaust turbine turbocharger according to a third embodiment.

FIG. 6 is a sectional view illustrating a screw fastening portion between a compressor and a rotary shaft in an exhaust turbine turbocharger according to a third embodiment. The same reference numerals will be given to members having the same functions as those according to the above-described embodiment, and detailed description thereof will be omitted.

In the third embodiment, as illustrated in FIG. 6, a screw portion 61 and a column portion 62 are disposed along the axial direction in the other end portion of a rotary shaft 14D. In a compressor 13D, a screw hole 63 into which the screw portion 61 is screwed and a cylindrical fitting hole 64 into which the column portion 62 is fitted are disposed along the axial direction. In the rotary shaft 14D, the column portion 62 is disposed on a side of the other end portion of the rotary shaft 14D from the screw portion 61. In the compressor 13D, the screw hole 63 is disposed on a side of the attachment surface 26a of a compressor impeller 26D from the fitting hole 64.

The compressor 13D has the expanded portion 26c in which the attachment surface 26a has a truncated cone shape toward the shaft center O. The screw hole 63 and the fitting hole 64 are open toward the attachment surface 26*a* side of the compressor impeller 26D, and are closed toward the tip portion 26*b* side. That is, the screw hole and the fitting hole 64 serve as an insertion hole whose tip portion 26*b* is closed along the shaft center O of the compressor impeller 26D. Then, in the compressor 13D, the screw hole 63 and the fitting hole 64 are located on a side of the attachment surface 26*a* from the largest outer diameter position A in the axial direction. A relationship between the axial length dimension and the inner diameter dimension of the screw portion 61, the column portion 62, the screw hole 63, and the fitting hole 64 is the same as that described in the first embodiment. In addition, in the rotary shaft 14D, one end portion side from the screw portion 61 is supported by the thrust ring 38, and the thrust ring 38 is supported by the thrust bearing 23.

Figure 7:
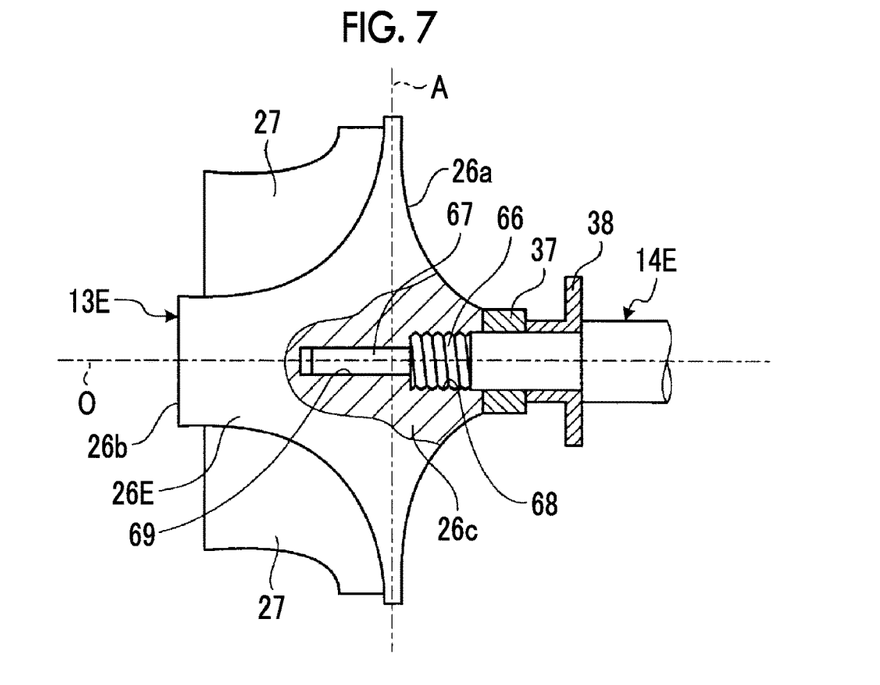
FIG. 7 is a sectional view illustrating a screw fastening portion between a compressor and a rotary shaft, which illustrates a modification example of the exhaust turbine turbocharger according to the third embodiment.

The screw portion 61 and the column portion 62 of the rotary shaft 14D and the screw hole 63 and the fitting hole 64 of the compressor 13D are not limited to the above-described configuration. FIG. 7 is a sectional view illustrating a screw fastening portion between a compressor and a rotary shaft, which illustrates a modification example of the exhaust turbine turbocharger according to the third embodiment.

As illustrated in FIG. 7, a screw portion 66 and a column portion 67 are disposed along the axial direction in the other end portion of a rotary shaft 14E. In a compressor 13E, a screw hole 68 into which the screw portion 66 is screwed and a cylindrical fitting hole 69 into which the column portion 67 is fitted are disposed along the axial direction. In the rotary shaft 14E, the column portion 67 is disposed on a side of the other end portion of the rotary shaft 14E from the screw portion 66. In the compressor 13E, the screw hole 68 is disposed on a side of the attachment surface 26*a* of a compressor impeller 26E from the fitting hole 69. In this case, the outer diameter of the column portion 67 and the inner diameter of the fitting hole 69 are ½ of the outer diameter of the screw portion 66 and the inner diameter of the screw hole 68.

The compressor 13E has the expanded portion 26*c* in which the attachment surface 26*a* has a truncated cone shape toward the shaft center O. The screw hole 68 and the fitting hole 69 are open toward the attachment surface 26*a* side of the compressor impeller 26E, and are closed toward the tip portion 26*b* side. That is, the screw hole and the fitting hole 69 serve as an insertion hole whose tip portion is closed along the shaft center O of the compressor impeller 26E. Then, in the compressor 13E, the screw hole 68 is located on a side of the attachment surface 26*a* from the largest outer diameter position A in the axial direction. A relationship between the axial length dimension and the inner diameter dimension of the screw portion 66, the column portion 67, the screw hole 68, and the fitting hole 69 is the same as that described in the first embodiment. In addition, in the rotary shaft 14E, one end portion side from the screw portion 66 is supported by the thrust sleeve 37 and the thrust ring 38, and the thrust ring 38 is supported by the thrust bearing 23.

In this way, in the turbocharger according to the third embodiment, the screw hole 68 and the fitting hole 69 of the compressor 13E are disposed on the side of the attachment surface 26*a* from the largest outer diameter position A of the compressor 13E. Therefore, a position where the screw portion 61 of the rotary shaft 14E is screwed into the screw hole 68 of the compressor 13E and a position where the column portion 67 is fitted into the fitting hole 69 are not located at the largest outer diameter position A of the compressor 13E. Accordingly, the centrifugal stress acting on the largest outer diameter position A during the rotation of the compressor 13E does not directly affect the screw hole 68 and the fitting hole 69. Therefore, it is possible to suppress strength weakening of the compressor 13E.

Fourth Embodiment

Figure 8:
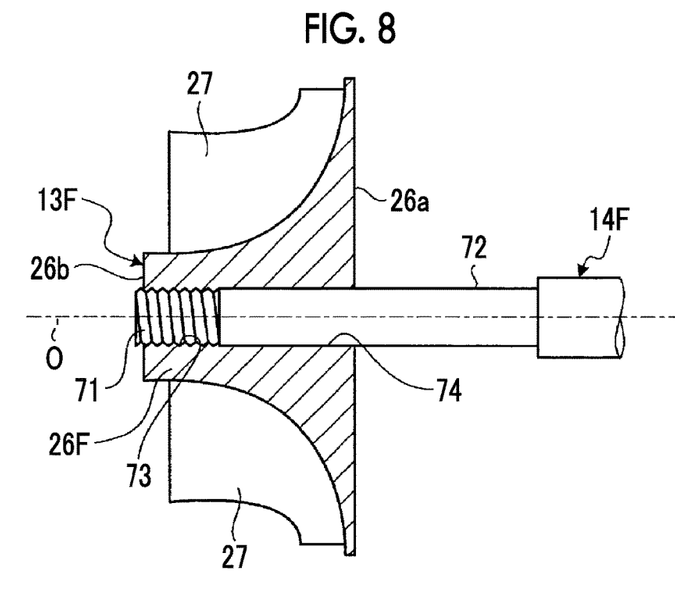
FIG. 8 is a sectional view illustrating a screw fastening portion between a compressor and a rotary shaft in an exhaust turbine turbocharger according to a fourth embodiment.
Figure 9:
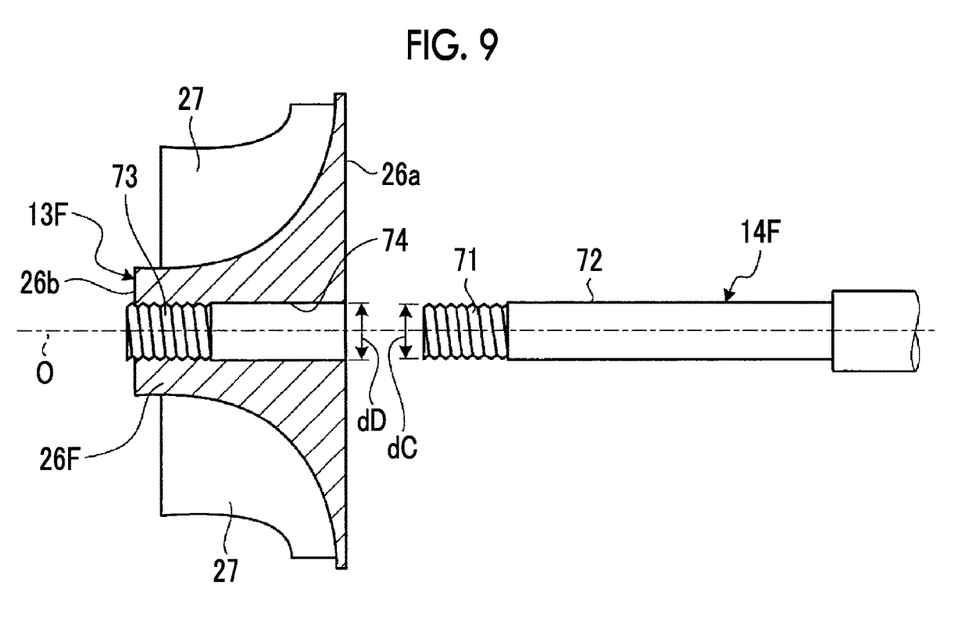
FIG. 9 is a sectional view illustrating a method of assembling the compressor and the rotary shaft to each other.

FIG. 8 is a sectional view illustrating a screw fastening portion between a compressor and a rotary shaft in an exhaust turbine turbocharger according to a fourth embodiment. FIG. 9 is a sectional view illustrating a method of assembling the compressor and the rotary shaft to each other. The same reference numerals will be given to members having the same functions as those according to the above-described embodiments, and detailed description thereof will be omitted.

In the fourth embodiment, as illustrated in FIG. 8, the other end portion (left end portion in FIG. 8) of a rotary shaft 14F has a screw portion 71 and a column portion 72 which are disposed along the axial direction. In a compressor 13F, a screw hole 73 into which the screw portion 71 is screwed and a cylindrical fitting hole 74 into which the column portion 72 is fitted are disposed along the axial direction. In the rotary shaft 14F, the screw portion 71 is disposed on a side of the other end portion of the rotary shaft 14F from the column portion 72. In the compressor 13F, the fitting hole 74 is disposed on a side of the attachment surface 26*a* of a compressor impeller 26F from the screw hole 73. Here, in the compressor 13F, the screw hole 73 and the fitting hole 74 are open toward the attachment surface 26*a* side and the tip portion 26*b* side of the compressor impeller 26F. That is, the screw hole 73 and the fitting hole 74 serve as a through-hole disposed along the shaft center O of the compressor impeller 26F.

Then, in the rotary shaft 14F, the axial length dimension of the column portion 72 is set to be longer than the axial length dimension of the screw portion 71. In addition, in the compressor 13F, the axial length dimension of the fitting hole 74 is set to be longer than the axial length dimension of the screw hole 73. In addition, an inner diameter dimension dD of the fitting hole 74 of the compressor 13F is set to be larger than an outer diameter dimension dC of the screw portion 71 of the rotary shaft 14F. Then, in the compressor 13F, the screw hole 73 is located on a side of the tip portion 26*b* from the largest outer diameter position A in the axial direction.

Therefore, as illustrated in FIG. 9, when the rotary shaft 14F disposed in the turbine 12 is connected to the compressor 13F, the screw portion 71 and the column portion 72 which are disposed in the other end portion of the rotary shaft 14F are rotated by being inserted into the screw hole 73 and the fitting hole 74 which are disposed in the compressor 13F. In this case, in the rotary shaft 14F, after the screw portion 71 first passes through the fitting hole 74 of the compressor 13F, the column portion 72 is fitted into the fitting hole 74. That is, in the screw portion 71 of the rotary shaft 14F, an outer diameter dimension dC is smaller than an inner diameter dimension dD of the fitting hole 74. Accordingly, the outer peripheral surface does not come into contact with the inner peripheral surface of the fitting hole 74. In addition, the axial length dimension of the column portion 72 of the rotary shaft 14F is longer than the axial length dimension of the screw hole 73 of the compressor 13F. Accordingly, the column portion 72 is fitted into the fitting hole 74 before the screw portion 71 comes into contact with the screw hole 73. Therefore, since the column portion 72 is fitted into the fitting hole 74, the shaft center O of the rotary shaft 14F coincides with the shaft center O of the compressor 13F. Thereafter, when the screw portion 71 of the rotary shaft 14F is screwed into the screw hole 73 of the compressor 13F, the shaft center of the rotary shaft 14F and the shaft of the compressor 13F coincide with each other. Therefore, the screw portion 71 and the screw hole 73 are properly screwed to each other without being damaged.

In this way, in the turbocharger according to the fourth embodiment, the screw portion 71 is disposed on the side of the other end portion of the rotary shaft 14F from the column portion 72, and the fitting hole 74 is disposed on the side of the attachment surface 26a of the compressor 13F from the screw hole 73. Therefore, when the rotary shaft 14F is connected to the compressor 13F, and when the screw portion 71 of the rotary shaft 14F passes through the fitting hole 74 of the compressor 13F, the column portion 72 is fitted into the fitting hole 74 of the compressor 13F, and both the shaft centers O coincide with each other. Accordingly, thereafter, the screw portion 71 of the rotary shaft 14F is very accurately screwed into the screw hole 73 of the compressor 13F. Therefore, it is possible to suppress damage caused by interference between the screw portion 71 and the compressor 13F.

In the turbocharger according to the fourth embodiment, the inner diameter dimension of the fitting hole 74 is set to be larger than the outer diameter dimension of the screw portion 71. Therefore, when the rotary shaft 14F is connected to the compressor 13F, the screw portion 71 of the rotary shaft 14F passes through the fitting hole 74 of the compressor 13F, and is properly screw into the screw hole 73. Therefore, it is possible to suppress damage caused by interference between the screw portion 71 and the fitting hole 74.

In the turbocharger according to the fourth embodiment, the screw hole 73 is disposed on the side of the tip portion 26b of the compressor 13F from the largest outer diameter position A of the compressor 13F. Therefore, a position where the screw portion 71 of the rotary shaft 14F is screwed into the screw hole 73 of the compressor 13F is not located at the largest outer diameter position A of the compressor 13F. Accordingly, the centrifugal stress acting on the largest outer diameter position A during the rotation of the compressor 13F does not directly affect the screw hole 73. Therefore, it is possible to suppress strength weakening of the compressor 13F.

The above-described embodiments embodiment adopt a configuration in which the respective outer diameter shapes of the compressor impellers configuring the compressor are substantially the same as each other. However, for example, in a configuration in which the rotary shaft does not penetrate the tip portion side of the compressor, the outer diameter dimension of the tip portion of the compressor impeller may be set to be smaller so as to have a conical shape, for example.

REFERENCE SIGNS LIST

11: exhaust turbine turbocharger
12: turbine
13, 13A, 13B, 13D, 13E, 13F: compressor
14, 14A, 14B, 14C, 14D, 14E, 14F: rotary shaft
15: housing
21, 22: journal bearing
23: thrust bearing
24: turbine disk
25: turbine blade
26, 26A, 26B, 26D, 26E, 26F: compressor impeller
26a: attachment surface
26b: tip portion
26c: expanded portion
27: blade
34: suction opening
41, 46, 51, 61, 66, 71: screw portion
42, 47, 52, 62, 67, 72: column portion
43, 48, 53, 63, 68, 73: screw hole
44, 49, 54, 64, 69, 74: fitting hole
55: truncated cone portion
56: hemispherical surface portion

The invention claimed is:

1. A turbocharger comprising:
a housing having a hollow shape;
a rotary shaft rotatably supported by the housing;
a turbine disposed in one end portion in an axial direction in the rotary shaft; and
a compressor disposed in the other end portion in the axial direction in the rotary shaft,
wherein a screw portion and a column portion are disposed along the axial direction in the other end portion of the rotary shaft,
wherein a screw hole into which the screw portion is screwed and a fitting hole into which the column portion is fitted are disposed along the axial direction in the compressor,
wherein each axial length dimension of the column portion and the fitting hole is set to be longer than each axial length dimension of the screw portion and the screw hole,
wherein the column portion is disposed on a side of the other end portion of the rotary shaft from the screw portion, and the screw hole is disposed on a side of an attachment surface of the compressor from the fitting hole, and
a diameter of the column portion is smaller than a diameter of the fitting hole and a pitch diameter of the screw portion is smaller than a pitch diameter of the screw hole.

2. The turbocharger according to claim 1,
wherein an outer diameter dimension of the column portion is set to be smaller than an inner diameter dimension of the screw hole.

3. The turbocharger according to claim 1,
wherein the screw hole and the fitting hole are disposed on a side of an attachment surface of the compressor from a largest outer diameter position of the compressor.

4. The turbocharger according to claim 1,
wherein the screw hole and the fitting hole are disposed on a side of a tip portion of the compressor from a largest outer diameter position of the compressor.

5. The turbocharger according to claim 1,
wherein the screw hole and the fitting hole are open toward a side of an attachment surface of the compressor, and are closed toward a side of a tip portion of the compressor.

6. The turbocharger according to claim 1,
wherein the screw hole and the fitting hole are open toward a side of an attachment surface and a side of a tip portion of the compressor.

7. The turbocharger according to claim 6,
wherein the other end portion of the rotary shaft protrudes to the side of the tip portion of the compressor, and has a tapered shape.

8. The turbocharger according to claim 2,
wherein the screw hole and the fitting hole are disposed on a side of an attachment surface of the compressor from a largest outer diameter position of the compressor.

9. The turbocharger according to claim 2,
wherein the screw hole and the fitting hole are disposed on a side of a tip portion of the compressor from a largest outer diameter position of the compressor.

10. The turbocharger according to claim 2,
wherein the screw hole and the fitting hole are open toward a side of an attachment surface of the compressor, and are closed toward a side of a tip portion of the compressor.

11. The turbocharger according to claim 3,
wherein the screw hole and the fitting hole are open toward a side of an attachment surface of the compressor, and are closed toward a side of a tip portion of the compressor.

12. The turbocharger according to claim 4,
wherein the screw hole and the fitting hole are open toward a side of an attachment surface of the compressor, and are closed toward a side of a tip portion of the compressor.

13. The turbocharger according to claim 2,
wherein the screw hole and the fitting hole are open toward a side of an attachment surface and a side of a tip portion of the compressor.

14. The turbocharger according to claim 3,
wherein the screw hole and the fitting hole are open toward a side of an attachment surface and a side of a tip portion of the compressor.

15. The turbocharger according to claim 4,
wherein the screw hole and the fitting hole are open toward a side of an attachment surface and a side of a tip portion of the compressor.

* * * * *